US010461471B2

(12) United States Patent
Miwa et al.

(10) Patent No.: US 10,461,471 B2
(45) Date of Patent: Oct. 29, 2019

(54) STRUCTURE FOR INSTALLING ACTUATOR

(71) Applicant: MURAKAMI CORPORATION, Shizuoka (JP)

(72) Inventors: Hiroya Miwa, Shizuoka (JP); Akira Fukai, Shizuoka (JP); Fumitaka Kitagawa, Shizuoka (JP)

(73) Assignee: MURAKAMI CORPORATION, Shizuoka (JP)

(*) Notice: Subject to any disclaimer, the term of this patent is extended or adjusted under 35 U.S.C. 154(b) by 0 days.

(21) Appl. No.: 15/923,269

(22) Filed: Mar. 16, 2018

(65) Prior Publication Data
US 2018/0269628 A1    Sep. 20, 2018

(30) Foreign Application Priority Data
Mar. 17, 2017    (JP) .................. 2017-052472

(51) Int. Cl.
*H01R 13/639*    (2006.01)
*B60L 53/16*    (2019.01)

(52) U.S. Cl.
CPC ............ *H01R 13/639* (2013.01); *B60L 53/16* (2019.02)

(58) Field of Classification Search
CPC .. H01R 13/6272–6273; H01R 13/6278; H01R 13/639; H01R 2201/26; B60L 53/16
See application file for complete search history.

(56) References Cited

U.S. PATENT DOCUMENTS

| | | | | | |
|---|---|---|---|---|---|
| 4,915,643 | A | * | 4/1990 | Samejima ........ | H01R 13/6272 439/357 |
| 5,110,302 | A | * | 5/1992 | Kobler ............ | H01R 13/6272 439/357 |
| 5,538,438 | A | * | 7/1996 | Orlando .......... | H01R 13/506 439/344 |
| 2001/0003069 | A1 | * | 6/2001 | Sekido ........... | H01H 85/2045 439/76.2 |
| 2011/0281452 | A1 | * | 11/2011 | Kurumizawa ..... | B60L 53/65 439/304 |
| 2014/0167696 | A1 | * | 6/2014 | Kahara .......... | B60L 11/1818 320/109 |
| 2015/0343913 | A1 | * | 12/2015 | Fukai ........... | H01R 13/639 74/530 |
| 2016/0013580 | A1 | * | 1/2016 | Matsuda ......... | H01R 13/5202 439/190 |
| 2016/0013587 | A1 | * | 1/2016 | Shimizu ......... | H01R 13/5227 439/153 |

(Continued)

FOREIGN PATENT DOCUMENTS

JP    2014-120421    6/2014

*Primary Examiner* — James Harvey
*Assistant Examiner* — Oscar C Jimenez
(74) *Attorney, Agent, or Firm* — Greenblum & Bernstein, P.L.C.

(57) ABSTRACT

Provided is a structure for installing an actuator capable of preventing mischief to a connector. The structure for installing the actuator has an installing surface provided on a power receiving connector, and the actuator. The actuator includes a lower housing to be installed over the installing surface, and an upper housing to be attached to the first housing, and the connector for connecting the lower housing and the upper housing. The installing surface has a step surface for hiding a tip of the connector.

5 Claims, 10 Drawing Sheets

(56) References Cited

U.S. PATENT DOCUMENTS

| | | | |
|---|---|---|---|
| 2016/0064862 A1* | 3/2016 | Nagasaki | H01R 13/639 439/660 |
| 2016/0072213 A1* | 3/2016 | Ichio | H01R 13/4367 439/34 |
| 2017/0341523 A1* | 11/2017 | Hirashita | B60L 11/1818 |

* cited by examiner

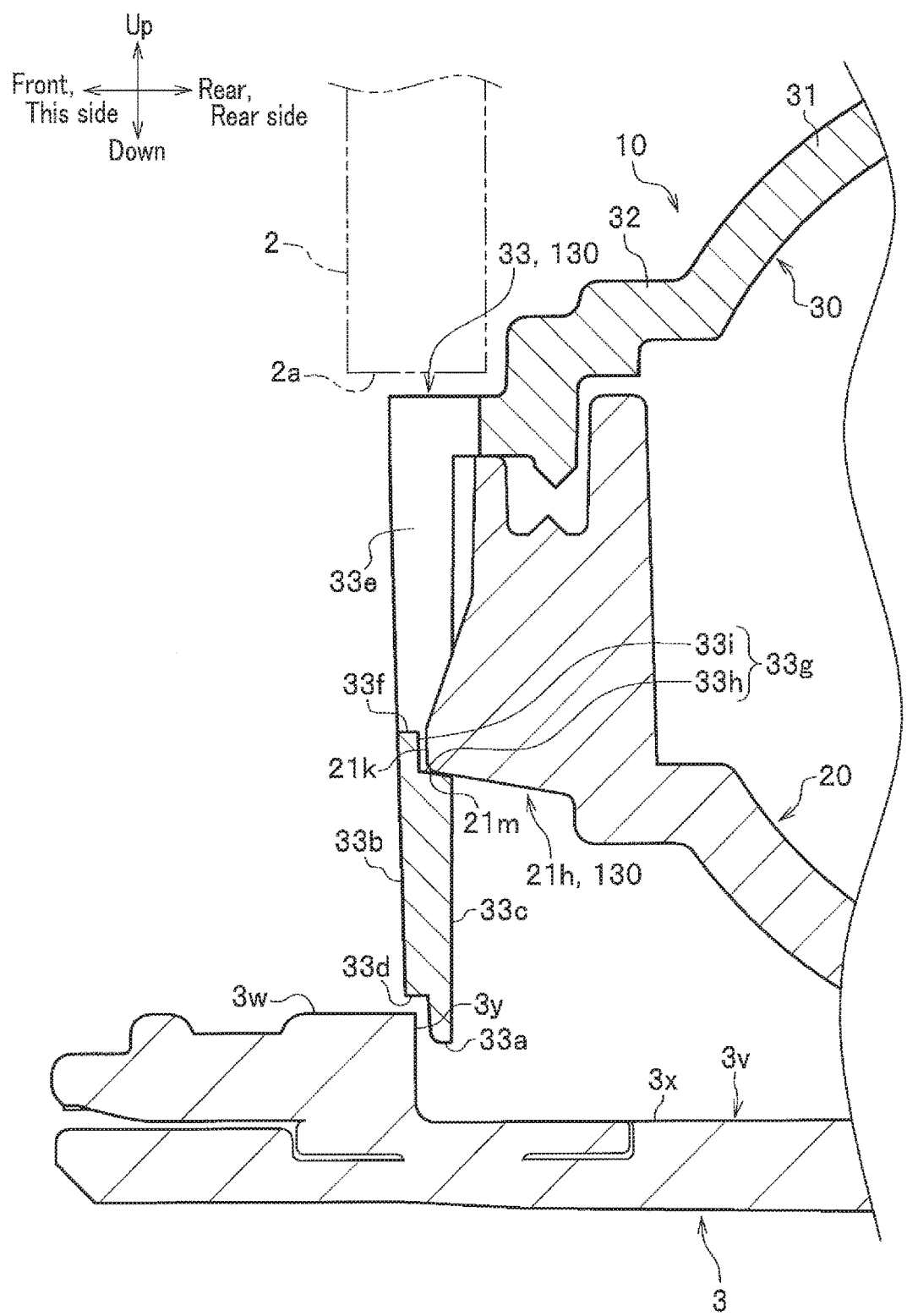

STRUCTURE FOR INSTALLING ACTUATOR

CROSS REFERENCE TO RELATED APPLICATIONS

This application claims the foreign priority benefit under Title 35, United States Code, 119 (a)-(d) of Japanese Patent Application No. 2017-052472, filed on Mar. 17, 2017 in the Japan Patent Office, the disclosure of which is herein incorporated by reference in its entirety.

BACKGROUND OF THE INVENTION

1. Technical Field

The present invention relates to a structure for installing an actuator.

2. Description of Background Art

When a storage battery mounted on a vehicle such as an electric vehicle or a hybrid vehicle is charged, a charging connector of a charging cable is attached to a power receiving connector provided at a charging port of a vehicle body to feed power through the charging cable to the storage battery. Normally, an actuator is provided at the power receiving connector for preventing the charging connector from being disconnected from the power receiving connector.

An example of such an actuator is one that includes a lower housing arranged over the power receiving connector, an upper housing arranged over the lower housing, and a connector for connecting the lower housing and the upper housing (see Patent Document 1, for example).

The connector includes a claw extending downward from an outer peripheral edge of the upper housing, and an engaging protrusion provided at the lower housing and for engaging with the claw.

Patent document 1: JP2014-120421, A

BRIEF SUMMARY OF THE INVENTION

A prior connector is set at a position where it can be seen through the charging port. Therefore, there is a fear that a tip of the claw is moved toward this side to disengage the engagement between the claw and the engaging protrusion, the claw is broken, and so on. That is, there is a fear that the claw becomes a target of mischief. In particular, when a fragment of the broken claw is held between the power receiving connector and the charging connector, there is a fear that the charging connector cannot be attached to the power receiving connector.

An object of the present invention is to provide a structure for installing an actuator, which solves the above-described problems to prevent mischief of a third party to the connector.

In order to solve the problem, the present invention is a structure for installing an actuator, the structure has an installing surface provided on a power receiving connector, and the actuator. The actuator comprises a first housing to be installed over the installing surface, a second housing to be attached to the first housing, and a connector for connecting the first housing and the second housing. Furthermore, the installing surface includes a hiding part for hiding a tip of the connector.

According to the present invention, the tip of the connector can be hidden by the hiding part, so that the tip of the connector cannot be moved toward this side because of the presence of the hiding part. Thus, mischief of a third party to the connector can be prevented.

It is preferable that the connector comprises a claw provided on the second housing, and an engaging protrusion provided on the first housing and for engaging with the claw, and that the hiding part hides a tip of the claw.

According to this construction, the tip of the claw can be hidden by the hiding part, so that the tip of the connector cannot be moved toward this side because of the presence of the hiding part. Thus, mischief of a third party to the connector can be prevented.

It is preferable that the hiding part is constructed to include a step surface, a recessed portion or a through hole.

According to this construction, mischief of a third party to the claw can be prevented without additional parts. Thus, the cost necessary for preventing mischief can be reduced.

It is preferable that the claw includes another hiding part for hiding the whole or a part of the engaging protrusion.

According to this construction, mischief of a third party to the engaging protrusion can be prevented.

According to the structure for installing an actuator of the present invention, mischief of a third party to the connector can be prevented.

BRIEF DESCRIPTION OF DRAWINGS

FIG. 9 is a sectional view taken along a line IX-IX of FIG. 8;

DETAILED DESCRIPTION OF THE INVENTION

An embodiment of the present invention will be described in detail with reference to the attached drawings as appropriate. Note that in the following description, "up and down," "front and rear," "right and left" of an actuator 10 are set for the purpose of convenience in describing the structure of the actuator 10, and are not intended to limit an orientation of the actuator 10 or the like.

<Construction of Actuator>

Figure 1:
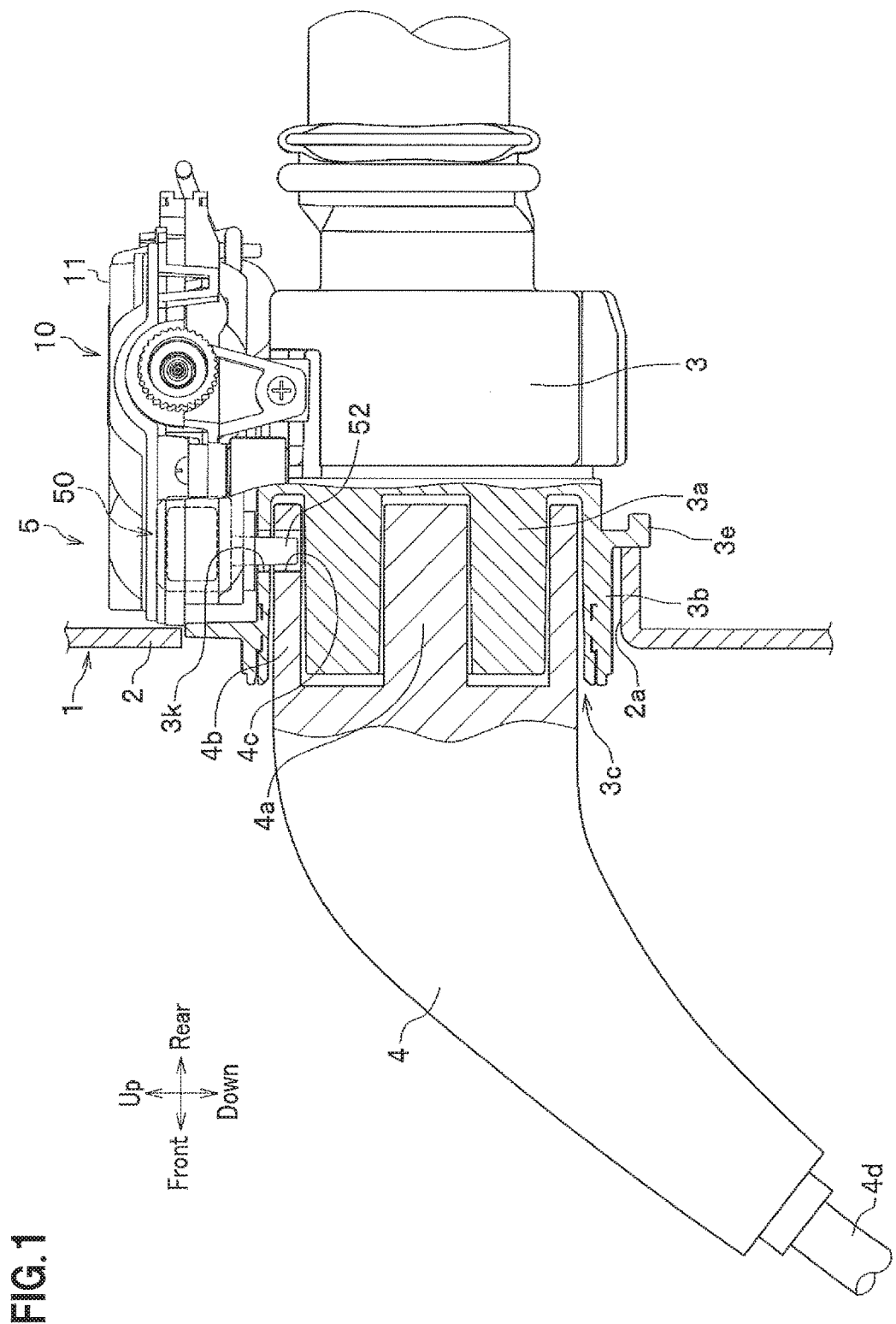
FIG. 1 is a side view of an actuator being used according to an embodiment of the present invention, with a power receiving connector and a charging connector partly shown in a sectional view.

As shown in FIG. 1, the actuator 10 of the present embodiment constitutes a lock mechanism 5 that is mounted in a charging port 2a of a vehicle 1 such as an electric vehicle and a hybrid vehicle. The lock mechanism 5 prevents a charging connector 4 (sometimes referred to as "charging gun") from coming off a power receiving connector 3 (sometimes called as "inlet"), while a storage battery (not shown) mounted on the vehicle 1 is charged.

The power receiving connector 3 is electrically connected to the storage battery (not shown) via a cable (not shown). The charging connector 4 is electrically connected to a charging device (not shown), such as a charging station, via a charging cable 4d. The charging port 2a is a space for accommodating the front end portion of the power receiving connector 3 and is formed at a specific position (for example, the front portion) of a vehicle body 2. The power receiving connector 3 is arranged at the charging port 2a.

Figure 2:
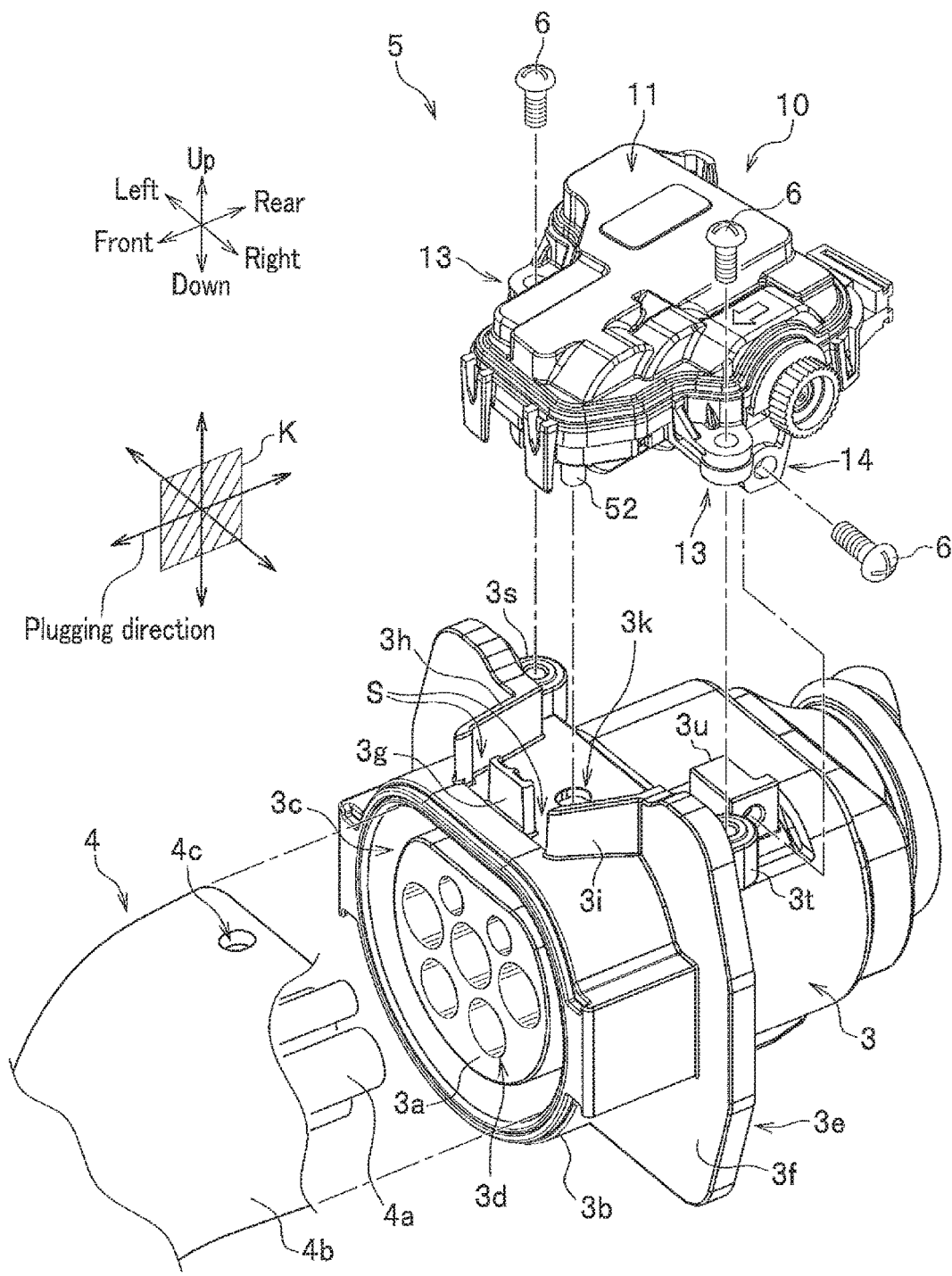
FIG. 2 is an exploded perspective view showing a lock mechanism according to the embodiment and its surroundings.

The charging connector 4 is configured to be detachably attached to the power receiving connector 3. As shown in FIG. 2, two or more convex terminals 4a having a columnar shape are formed at the front end of the charging connector 4. The convex terminals 4a feed therethrough a large current supplied from a charging device (not shown), such as a charging station, to the vehicle 1. A cylindrical protective cover 4b having a predetermined thickness is formed around the convex terminals 4a. The protective cover 4b is open at the front end thereof and accommodates the convex terminals 4a therein in the state that the convex terminals 4a are exposed to the outside. The protective cover 4b is formed, on its upper portion, with a fitting hole 4c into which a lock pin 52 protruding downward from the actuator 10 fits. The fitting hole 4c is a part of the lock mechanism 5.

As shown in FIG. 2, the power receiving connector 3 is formed, at the front end, with a concave terminal 3a in a substantially columnar shape that has two or more holes 3d formed therein. The concave terminal 3a is fitted to the convex terminals 4a of the charging connector 4 to take in a large current supplied from a charging device (not shown) such as a charging station. A cylindrical protective cover 3b is formed around the concave terminal 3a and accommodates the concave terminal 3a therein. A gap 3c is defined between the concave terminal 3a and the protective cover 3b so that the protection cover 4b is fitted to the gap 3c in the state where the concave terminal 3a is fitted to the convex terminals 4a (see FIG. 1).

The protective cover 3b is formed, on its outer peripheral surface, with a flange 3e. The flange 3e mainly includes a main body 3f, a front wall 3g, and side walls 3h, 3i. The main body 3f is a plate-like member formed on the right side, the left side, and the lower side of the power receiving connector 3. The main body 3f is formed thereon with attaching means (not shown), and the power receiving connector 3 is fixed to the charging port 2a via the main body 3f. This causes the power receiving connector 3 to have its part in front of the flange 3e exposed in the charging port 2a, and its part behind the flange 3e accommodated in the vehicle body 2.

The shapes of the front wall 3g and the side walls 3h, 3i correspond to the shape of the front portion of the actuator 10, to have gaps S between the front wall 3g and the respective side walls 3h, 3i.

The front wall 3g is a rectangular plate member formed so as to extend upward from the protective cover 3b at a position anterior to the main body 3f. The front wall 3g is formed in parallel to the main body 3f.

The side wall 3h is a rectangular plate member formed so as to extend obliquely frontward and rightward from one end of the main body 3f, and the side wall 3i is a rectangular plate member formed so as to extend obliquely frontward and leftward from the other end of the main body 3f.

An upper surface of the power receiving connector 3 behind the front wall 3g, is lower than an upper surface of the power receiving connector 3 in front of the front wall 3g. An insertion hole 3k, which leads to the gap 3c, is formed in the upper surface of the power receiving connector 3, on the rear side of the front wall 3g. Inserting the charging connector 4 into the power receiving connector 3 causes the insertion hole 3k of the power receiving connector 3 to communicate with the fitting hole 4c of the charging connector 4. The lock pin 52 protruding downward from the actuator 10 is inserted into the insertion hole 3k, in the state that the charging connector 4 is attached to the power receiving connector 3. A detailed description about the upper surface of the power receiving connector 3 around the front wall 3g will be done later.

The power receiving connector 3 is formed, on its upper surface posterior to the flange 3e, with seatings 3s, 3t, 3u on which the actuator 10 is mounted. The seatings 3s, 3t are formed with threaded holes in the vertical direction, and the seating 3u is formed with a threaded hole in the right-left direction. Screws 6 are used to fix the actuator 10 to the seatings 3s, 3t, 3u.

The locking mechanism 5 in FIG. 2 includes an actuator 10 arranged over the power receiving connector 3, and the fitting hole 4c formed in the charging connector 4. The lock pin 52 protruding downward from the actuator 10 is fitted into the fitting hole 4c.

The actuator 10 is a device for preventing the charging connector 4 from coming off in the state that the charging connector 4 is attached to the power receiving connector 3. The actuator 10 mainly includes a housing 11 that is a box made of resin, and a driving mechanism 12 (see FIG. 3) that is accommodated in the housing 11.

As shown in FIG. 2, the housing 11 is formed, on its right and left side surfaces, with a pair of supporters 13 protruding rightward and leftward, and, on the right and lower surface of the housing 11, with a supporter 14 protruding downward. The supporters 13, 14 are used to attach the actuator 10 to the upper portion of the power receiving connector 3 (see FIG. 1), so as to be fixed to the seatings 3s, 3t, 3u of the power receiving connector 3, respectively, by the screws 6.

Figure 3:
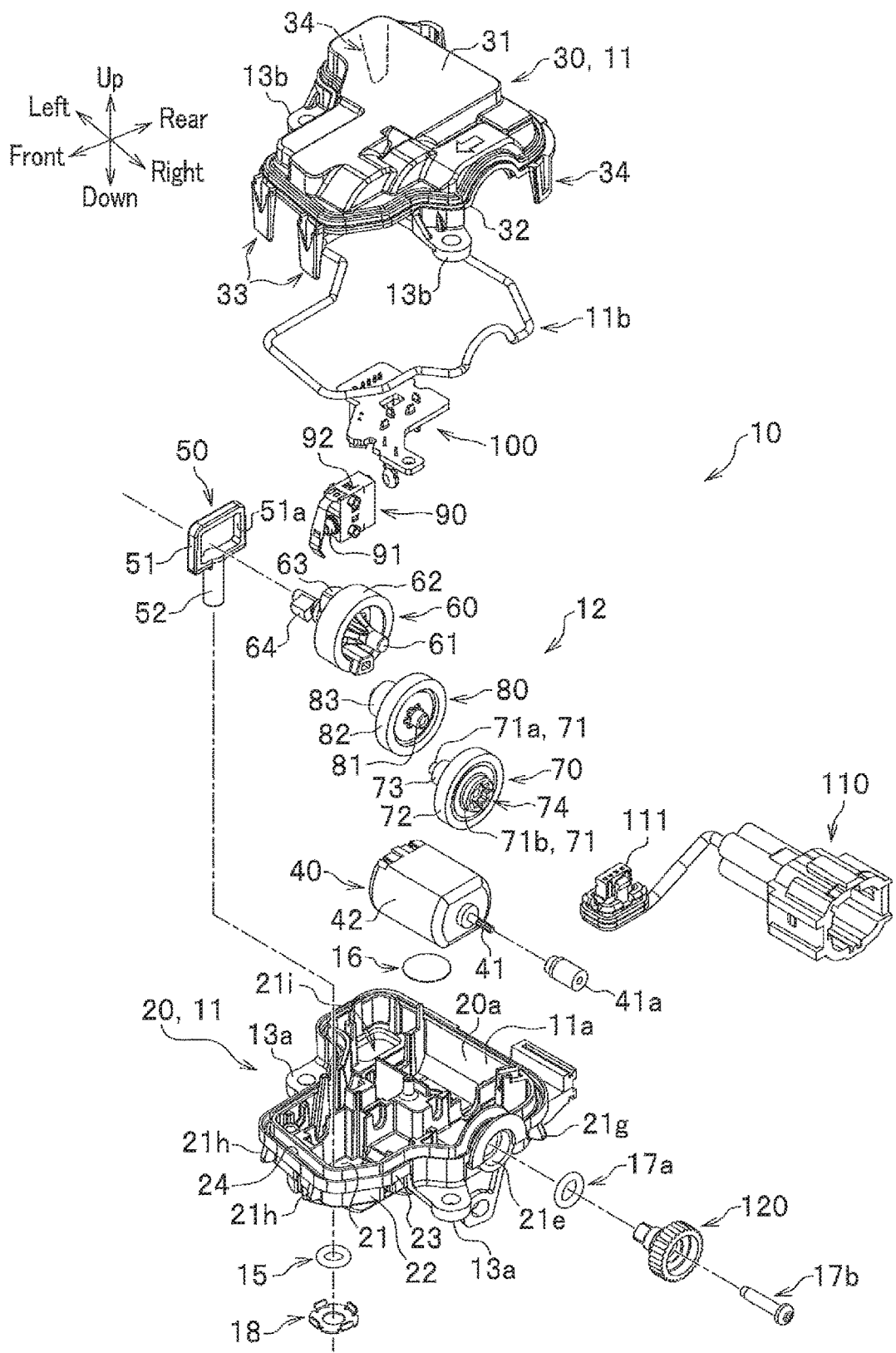
FIG. 3 is an exploded perspective view of an actuator according to the embodiment.

As shown in FIG. 3, the housing 11 mainly includes a lower housing 20 having a space inside, and an upper housing 30 for closing an opening 20a of the lower housing 20. Combining the lower housing 20 and the upper housing 30 defines a housing space 11a in the housing 11. The driving mechanism 12 is housed in the housing space 11a.

The lower housing 20 is a box-like member having the opening 20a formed on its upper surface, and mainly includes a bottom 21 in a flat plate shape and a peripheral wall 22 that stands on the outer peripheral edge of the bottom 21. The peripheral wall 22 is a frame that surrounds the housing space 11a. An opening edge 23, which is an upper end edge of the peripheral wall 22, protrudes outward beyond the outer surface of the peripheral wall 22 so as to have a flange shape, and an upper surface of the opening edge 23 is formed with a seal groove 24 along the entire circumference. An adhesive 11b such as a hot melt is applied to the seal groove 24. The adhesive 11b bonds the lower housing 20 with the upper housing 30 and prevents foreign matter from entering the housing space 11 from outside.

Figure 4:
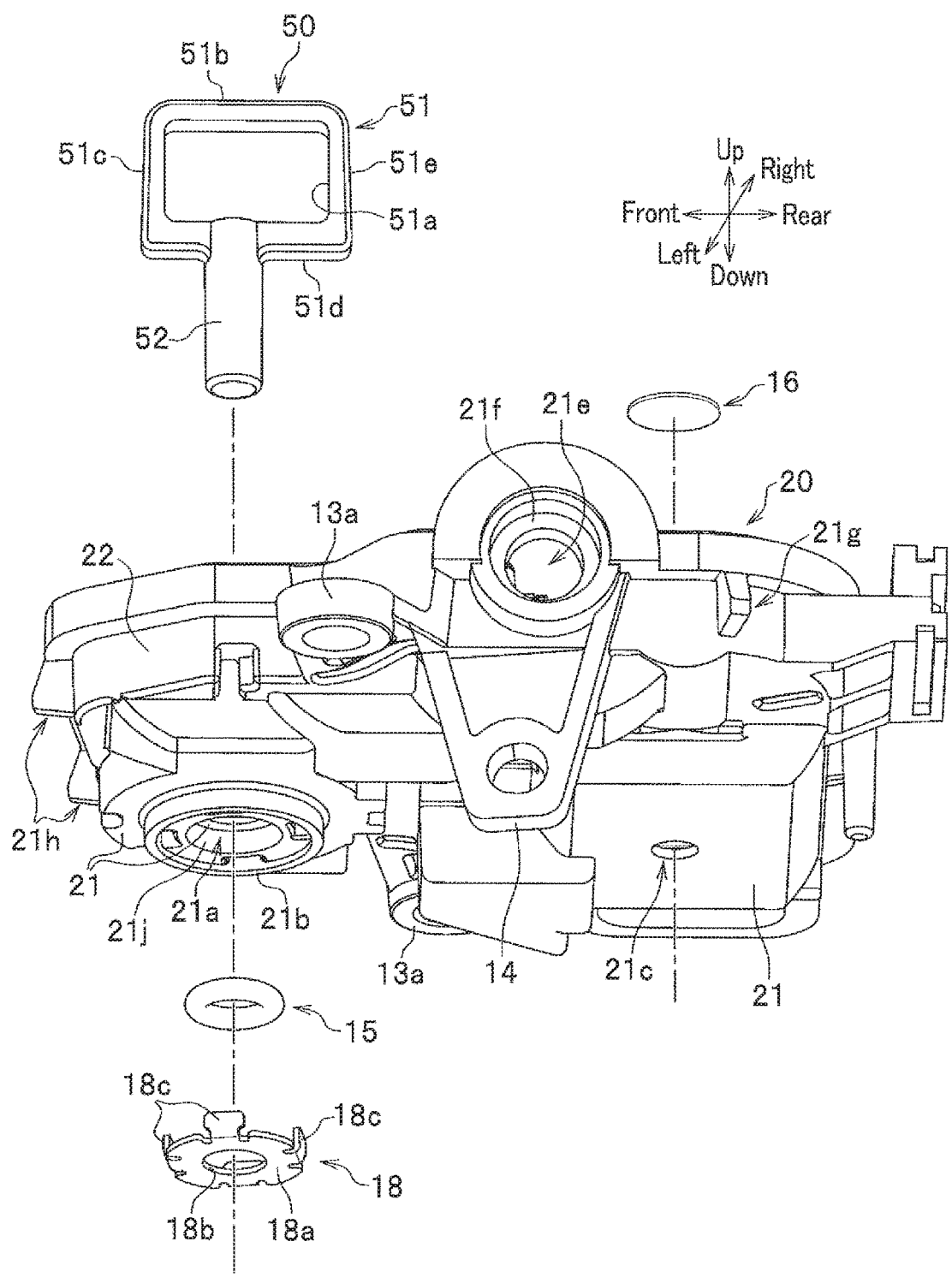
FIG. 4 is a view showing a lower housing of the actuator according to the embodiment, as viewed obliquely from below.

As shown in FIG. 4, the lower housing 20 is formed, on its right and left side surfaces, with a pair of protrusions 13a protruding outward from the peripheral wall 22. The pair of protrusions 13a constitutes the supporters 13 (see FIG. 2) for attaching the actuator 10 to the power receiving connector 3 (see FIG. 1).

The bottom 21 of the lower housing 20 is formed, on its front side, with an insertion hole 21a through which the lock pin 52 of a separation restricting member 50 is inserted. A peripheral edge 21b of the insertion hole 21a protrudes downward beyond other portions of the insertion hole 21a, so as to have an O-ring 15 attached thereto using an O-ring attachment 18. The O-ring 15 is attached to a stepped part defined by the bottom 21 and an inner peripheral surface 21j. The O-ring attachment 18 is made of metal and includes: a main plate body 18a that has a through hole 18b and is formed in a ring shape; and four risings 18c that rise from the outer edge of the main plate body 18a. The risings 18c are engaged with recesses formed on the peripheral edge 21b to cause the O-ring attachment 18 to fix the O-ring 15 to the bottom 21 of the lower housing 20.

The bottom 21 of the lower housing 20 is formed, on its rear side, with a circular air hole 21c. The air hole 21c is formed at a position below an electric motor 40 (see FIG. 3), to communicate the inside of the housing 11 with the outside thereof. The air hole 21c is covered from the inside by a moisture permeable waterproof material 16 having a circular shape.

The moisture permeable waterproof material 16 is made of a material that allows air to enter and exit but prevents water from entering and exiting, to prevent water and dust from entering the air hole 21c from the external space. The moisture permeable waterproof material 16 is formed to have a larger diameter than the air hole 21c. The moisture permeable waterproof material 16 is adhered to the inner surface of the bottom 21 by an adhesive means such as a double-faced tape.

The lower housing 20 is formed, in its upper right side-surface, with an insertion hole 21e through which a dial 120 (see FIG. 3) is inserted. The insertion hole 21e is provided with a recess 21f further back from the rest, so that an O-ring 17a (see FIG. 3) and the dial 120 are attached to the recess 21f using a dial fixing member 17b. The dial fixing member 17b has its front end engaged with a transmission member 70 (see FIG. 3) to fix the dial 120 to the transmission member 70.

As shown in FIG. 4, the lower housing 20 is formed, at the rear of its right side-surface, with an engaging protrusion 21g to be engaged with the upper housing 30. Although not shown, the engaging protrusion 21g is similarly formed at the rear of the left side-surface of the lower housing 20. In addition, the lower housing 20 is formed, on its front surface, with a pair of engaging protrusions 21h to be engaged with the upper housing 30. The engaging protrusions 21g, 21h are engaged with the upper housing 30. The engaging protrusions 21h will be described in detail later.

As shown in FIG. 3, the upper housing 30 is a lid member for closing the opening 20a of the lower housing 20. The upper housing 30 has a ceiling 31 in a flat plate shape, and an outer peripheral edge 32 of the ceiling 31 is formed to have the same shape as that of the outer peripheral of the opening edge 23 of the lower housing 20. The outer peripheral edge 32 of the ceiling portion 31 is engaged with the opening edge 23 of the lower housing 20 and is bonded to the opening edge 23 by the adhesive 11b. At this time, the adhesive 11b arranged along the opening edge 23 of the lower housing 20 liquid-tightly seals a gap between the lower housing 20 and the upper housing 30.

The upper housing 30 is formed, on its right and left, with a pair of protrusions 13b protruding outward from the outer peripheral edge 32 of the ceiling 31. The pair of protrusions 13b constitutes the supporters 13 (see FIG. 2) for attaching the actuator 10 to the power receiving connector 3 (see FIG. 1).

In addition, the upper housing 30 is formed, on its front surface, with a pair of front claws 33 extending downward from the outer peripheral edge 32 of the ceiling 31. Further, the upper housing 30 is formed, on its right and left rear sides, with a pair of rear claws 34 extending downward from the outer peripheral edge 32 of the ceiling 31. The rear claws 34 engage with the engagement protrusions 21g, and the front claws 33 engage with the engagement protrusions 21h to integrally couple the lower housing 20 and the upper housing 30. Furthermore, releasing such engagement allows for separating the lower housing 20 and the upper housing 30. The front claws 33 will be described in detail later.

The driving mechanism 12 will be described with reference to FIG. 3. The driving mechanism 12 mainly includes the electric motor 40, the separation restricting member 50, a cam member 60, and the transmission members 70, 80. The separation restricting member 50 is a member that moves up and down by the driving force of the electric motor 40. The cam member 60 has a cam gear 62 having a first cam 63 protruding therefrom. The transmission members 70, 80 are interposed between an output shaft 41 of the electric motor 40 and the cam gear 62.

In addition, the driving mechanism 12 further includes a sensor 90, a substrate 100, a power supply unit 110, and the dial 120. The sensor 90 is a device that detects a position of the separation restricting member 50. The substrate 100 has the electric motor 40 and the sensor 90 electrically connected thereto. The power supply unit 110 is electrically connected to a control device (not shown) mounted on the vehicle 1 (see FIG. 1), and supplies power to the substrate 100. The dial 120 is a member for manually driving the separation restricting member 50.

Figure 5:
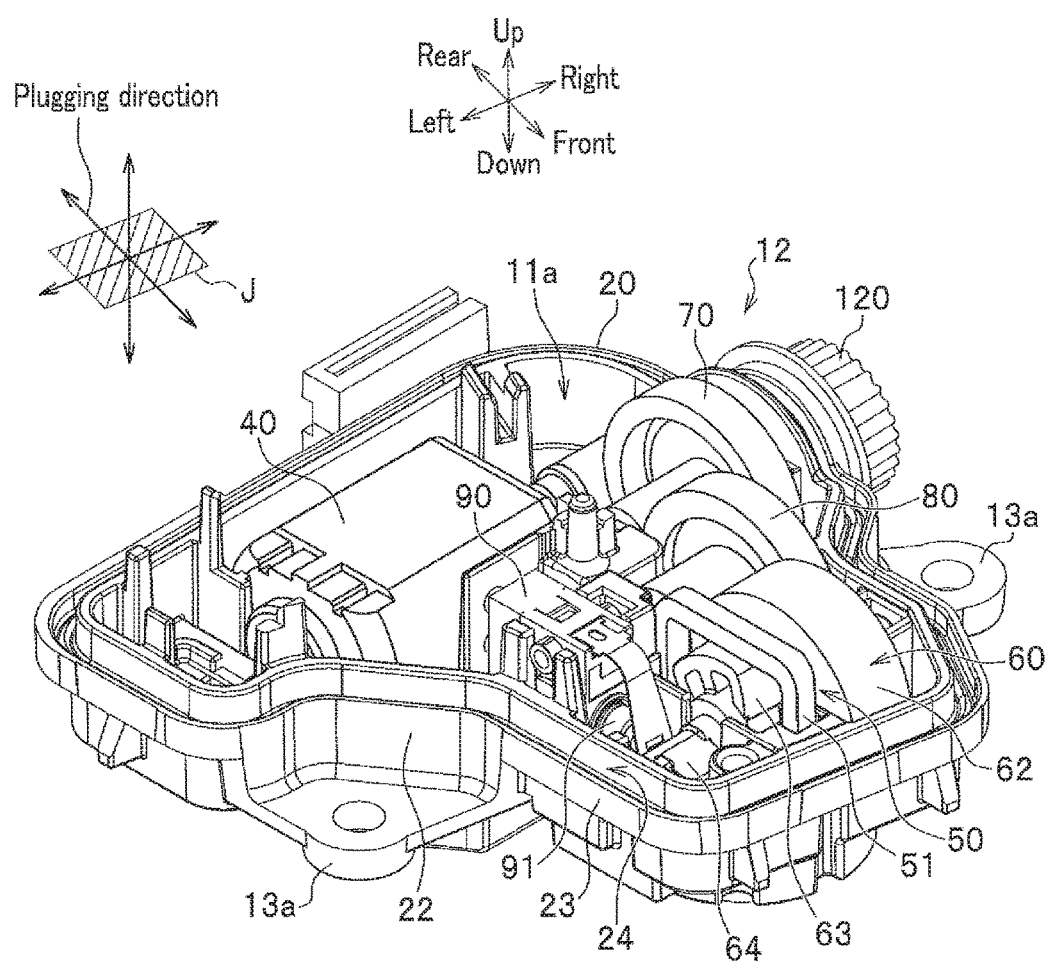
FIG. 5 is a perspective view of the inside of the actuator according to the embodiment.
Figure 6:
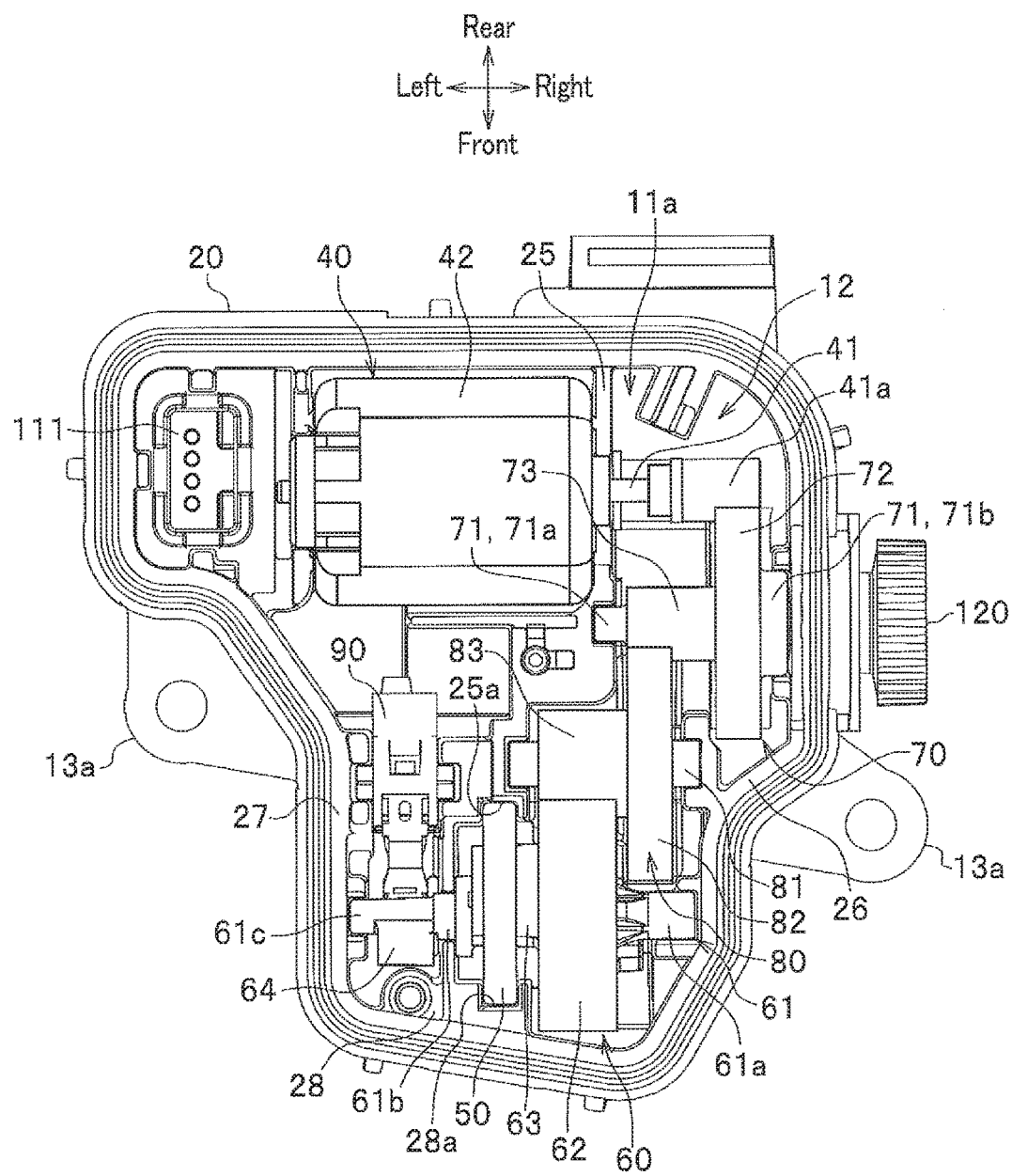
FIG. 6 is a plan view of the inside of the actuator according to the embodiment.

As shown in FIGS. 5 and 6, the driving mechanism 12 is housed in the housing space 11a in the lower housing 20.

As shown in FIG. 6, the electric motor 40 has a motor housing 42, and the output shaft 41 protrudes rightward from the motor housing 42. The output shaft 41 has a cylindrical gear 41a circumferentially inserted thereon. The electric motor 40 is arranged at the center in the rear zone of the housing space 11a of the housing 11.

The transmission member 70 is a two-stage gear and includes a rotation shaft 71 whose axial direction is arranged in the left-right direction, a first gear 72 having the rotation shaft 71 on its central axis, and a second gear 73 having the rotation axis 71 on its central axis. The second gear 73 has a smaller diameter than the first gear 72. The rotation shaft 71 of the first gear 72 (hereinafter, sometimes referred to as a "rotation shaft 71b") has a larger diameter than the rotation shaft 71 of the second gear 73 (hereinafter, sometimes referred to as a "rotation shaft 71a"), and has an engaging concave 74 (see FIG. 3) formed therein.

The transmission member 70 is arranged on the right side of the motor housing 42 in the housing space 11a. The rotation shaft 71a is rotatably supported by a central wall 25 formed longitudinally in the front-rear direction in the lower housing 20, and the rotation shaft 71b is rotatably supported by a right wall 26 of the lower housing 20. A space on the right side of the central wall 25 is filled with grease, while a space on the left side of the central wall 25 is not filled with grease. That is, the central wall 25 serves as a grease-scattering prevention wall that prevents grease from entering the space where the electric motor 40 is arranged. The first gear 72 engages with the gear 41a of the electric motor 40, while the second gear 73 engages with a third gear 82 of the transmission member 80.

As shown in FIG. 3, the transmission member 80 is a two-stage gear and includes a rotation shaft 81 whose axial direction is arranged in the right-left direction, the third gear 82 having the rotation shaft 81 on its central axis, and a fourth gear 83 having the rotation shaft 81 on its central axis. The fourth gear 83 has a smaller diameter than the third gear 82.

As shown in FIG. 6, the transmission member 80 is arranged in the housing space 11a, between the transmission member 70 and the cam member 60. The left end of the rotation shaft 81 is rotatably supported by the central wall 25 formed in the lower housing 20 and the right end of the rotation shaft 81 is rotatably supported by the right wall 26 of the lower housing 20. The third gear 82 engages with the second gear 73 of the transmission member 70, and the fourth gear 83 engages with the cam gear 62 of the cam member 60.

The cam member 60 in FIG. 3 is a member for vertically moving the separation restricting member 50. The cam member 60 includes a rotation shaft 61 whose axial direction is arranged in the right-left direction, the cam gear 62 that is a spur gear having the rotation shaft 61 on its central axis, the first cam 63, and a second cam 64. The first cam 63 protrudes from the left side-surface of the cam gear 62 and is eccentric with respect to the rotation center of the cam gear 62. The second cam 64 is formed closer to the front end (left side) than the first cam 63, and is eccentric with respect to the rotation center of the cam gear 62. The cam member 60 may be formed by joining individual members, but is integrally formed in the present embodiment.

As shown in FIG. 6, the cam member 60 is arranged in a front zone of the housing space 11a. A right end 61a of the rotation shaft 61 of the cam member 60 is rotatably supported by the right wall 26 in the lower housing 20 and the central part 61b of the rotation shaft 61 is rotatably supported by the central wall 25 formed in the lower housing 20. Note that a left end 61c of the rotation shaft 61 is not supported by a left wall 27 in the lower housing 20 to have a gap between the left end 61c and the left wall 27.

Figure 7:
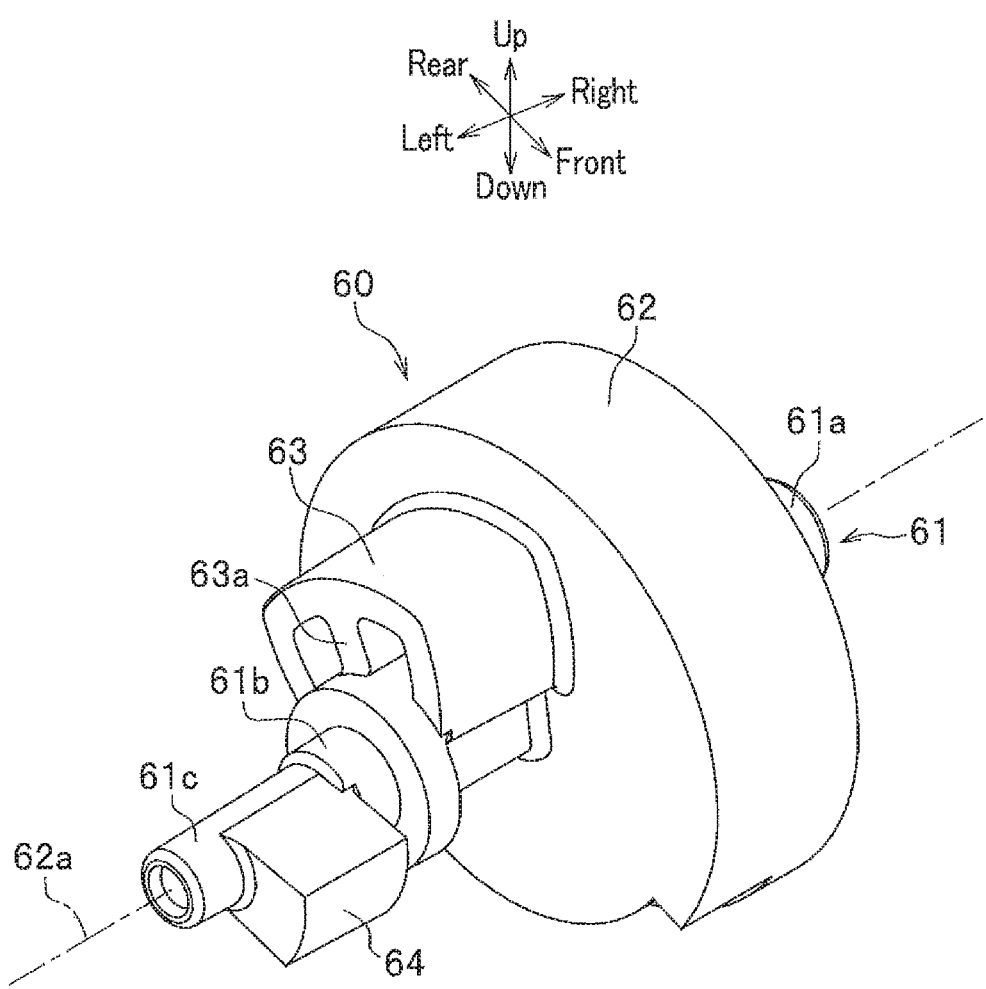
FIG. 7 is a perspective view of a cam member.

As shown in FIG. 7, the cam gear 62 is formed with teeth on the outer peripheral surface except a bottom part thereof.

The first cam 63 is a cam that comes into contact with the separation restricting member 50 (see FIG. 3), and protrudes from the left side-surface of the cam gear 62. The first cam 63 is formed to have an outer periphery in a substantially triangular shape in a side view, and one of three corners of the first cam 63 and its vicinity are arranged on the rotation center of the cam gear 62. That is, a central part 63a of the first cam 63 is eccentric with respect to the rotation center 62a of the cam gear 62. The first cam 63 is arranged in a cam receiving frame 51 of the separation restricting member 50 in FIG. 5. For the cam member 60, the rotation angle of the cam gear 62 is set so that the first cam 63 is rotated clockwise and counterclockwise about the rotation center of the cam gear 62 in a range less than one rotation. The second cam 64 is formed to protrude radially outward from, and be eccentric with respect to, the rotating shaft 61. The second cam 64 is a part detected by a switch 91 of the sensor 90 in FIG. 5.

As shown in FIGS. 5 and 6, in the present embodiment, the rotation shaft 61 of the cam member 60, the rotation shaft 71a of the transmission member 70, and the rotation shaft 81 of the transmission member 80 are all arranged in a single plane J (here, in the horizontal plane) and are arranged in parallel to one another in the right-left direction. Additionally, as shown in FIG. 2, these shafts are arranged substantially perpendicularly to a reference plane K defined by a line segment running in the direction of inserting and removing the charging connector 4 (here, front to rear) and a line segment extending from the housing 11 toward the power receiving connector 3 (here, up to down). Here, the wording "substantially perpendicularly to the reference plane K" is intended to allow a certain deviation in arranging the axis perpendicularly to the reference plane K, such as arranging the respective rotation shafts (in the actuator 10) in a state that the plane J is inclined at a predetermined angle (within 30 degrees, for example) to the horizontal plane.

The separation restricting member 50 in FIG. 3 is a member that prevents the charging connector 4 from coming off in the state that the charging connector 4 is attached to the power receiving connector 3. The separation restricting member 50 is arranged in a front zone of the housing space 11a. The separation restricting member 50 is made of resin and has the cam receiving frame 51 having an opening 51a which is open in the right-left direction, and the lock pin 52 integrally formed with the cam receiving frame 51.

As shown in FIG. 4, the cam receiving frame 51 is an endless member constructing a frame of the opening 51a having a rectangular shape in a side view, and includes an upper side 51b, a front side 51c, a bottom side 51d, and a rear side 51e. As shown in FIG. 5, the cam receiving frame 51 has the rotation shaft 61 of the cam member 60 inserted thereinto, and has the first cam 63 inserted thereinto from the right side of the opening 51a. The inner sides of the upper side 51b and bottom side 51d of the cam receiving frame 51 are cam receiving surfaces on which a cam surface of the first cam 63 abuts.

As shown in FIG. 6, the central wall 25 and front wall 28 of the lower housing 20 are respectively formed with a pair of guide grooves 25a, 28a extending vertically. In the state that the front side 51c is housed in the guide groove 28a and the rear side 51e is housed in the guide groove 25a, the separation restricting member 50 is vertically movable along the guide grooves 25a, 28a.

The cam surface of the first cam 63 abuts on the inside of the upper side 51b of the cam receiving frame 51 to lift the separation restricting member 50. Hereinafter, a state that the separation restricting member 50 is lifted is referred to as an "initial state", and a position of the separation restricting member 50 in the initial state is referred to as an "initial position".

Also, the cam surface of the first cam 63 abuts on the inside of the bottom side 51d of the cam receiving frame 51 to depress the separation restricting member 50. Hereinafter, a state that the separation restricting member 50 is depressed is referred to as a "restricting state," and a position of the separation restricting member 50 in the restricting state is referred to as a "restricting position".

As shown in FIG. 4, the lock pin 52 is a shaft member having a circular cross section, and is formed so as to extend downward from the bottom side 51d of the cam receiving frame 51. The lock pin 52 is arranged to have the axis running in the vertical direction, and the front end of the lock pin 52 is chamfered.

At the initial position, the front end of the lock pin 52 is positioned at a retreated position toward the inside of the housing 11 to allow the charging connector 4 to be detached. In contrast, at the restricting position, the front end of the lock pin 52 protrudes outward from the insertion hole 21a formed in the lower housing 20 (i.e., protrudes downward under the lower housing 20).

At the restricting position, the lock pin 52 is fitted into the fitting hole 4c formed in the charging connector 4 through the insertion hole 3k formed in the power receiving connector 3, as shown in FIG. 1. This restricts the charging connector 4 from coming off the power receiving connector 3.

The sensor 90 shown in FIG. 3 detects the position of the lock pin 52 and includes the switch 91 that is pressed by the second cam 64 of the cam member 60, and a main body 92 that outputs a state of the switch 91 to the control device as a detection signal or a release signal.

The substrate 100 in FIG. 3 controls driving the electric motor 40 and the sensor 90, and is electrically connected to the electric motor 40, the switch 91, and the power supply unit 110. The substrate 100 is arranged in the left rear zone of the housing space 11a.

The power supply unit 110 in FIG. 3 supplies electric power to the substrate 100, and has a male connector 111. The male connector 111 is fitted from under into a fitting hole 21i formed in its left rear part of the lower housing 20 so as to be connected to a female connector (not shown) of the substrate 100.

The dial 120 in FIG. 3 is attached to the engaging concave 74 of the transmission member 70 by using the dial fixing member 17b. The dial 120 can be rotated to vertically move the separation restricting member 50 without a driving force of the electric motor 40. For example, if the electric motor 40 fails for some reason, the dial 120 can be rotated to move the separation restricting member 50 from the restricting position to the initial position.

Next, with reference to FIGS. 8 and 9, a detailed description about the upper surface of the power receiving connector 3, the actuator 10, the front claws 33 and the engagement protrusions 21h will be made.

The upper surface (hereinafter, this surface may be called an installing surface 3v) of the power receiving connector 3 is a surface over which the actuator 10 is installed. The installing surface 3v shown in FIG. 9 includes a first installing surface 3w, a second installing surface 3x and a step surface 3y. The first installing surface 3w is a horizontal surface provided on this side of the charging port 2a. The first installing surface 3w is provided on the front side of the front wall 3g (in front of the front wall) (see FIG. 8). The second installing surface 3x is a horizontal surface provided on the rear side of the charging port 2a relative to the first installing surface 3w. The second installing surface 3x is provided on the rear side of the front wall 3g (behind the front wall). The second installing surface 3x is formed lower than the first installing surface 3w. That is, the second installing surface 3x is nearer to the power receiving connector 3 than the first installing surface 3w. The step surface 3y is a vertical surface for connecting the first installing surface 3w and the second installing surface 3x. The step surface 3y serves as a hiding part for hiding tips 33a of the front claws 33. Note that, the step surface 3y may be formed as an inclined surface which is lower toward this side or the rear side of the charging port 2a as it goes toward the second installing surface 3x from the first installing surface 3w. Furthermore, the first installing surface 3w is not necessarily needed.

The actuator 10 includes the lower housing 20 which is arranged over the installing surface 3v, the upper housing 30 which is attached to the lower housing 20 and positioned over the lower housing 20, and a connector 130 for connecting the lower housing 20 and the upper housing 30. The lower housing 20 is a first housing in claims, and the upper housing 30 is a second housing in claims. The connector 130 includes the front claws 33 provided at the upper housing 30 and the engaging protrusions 21h provided at the lower housing 20.

Figure 8:
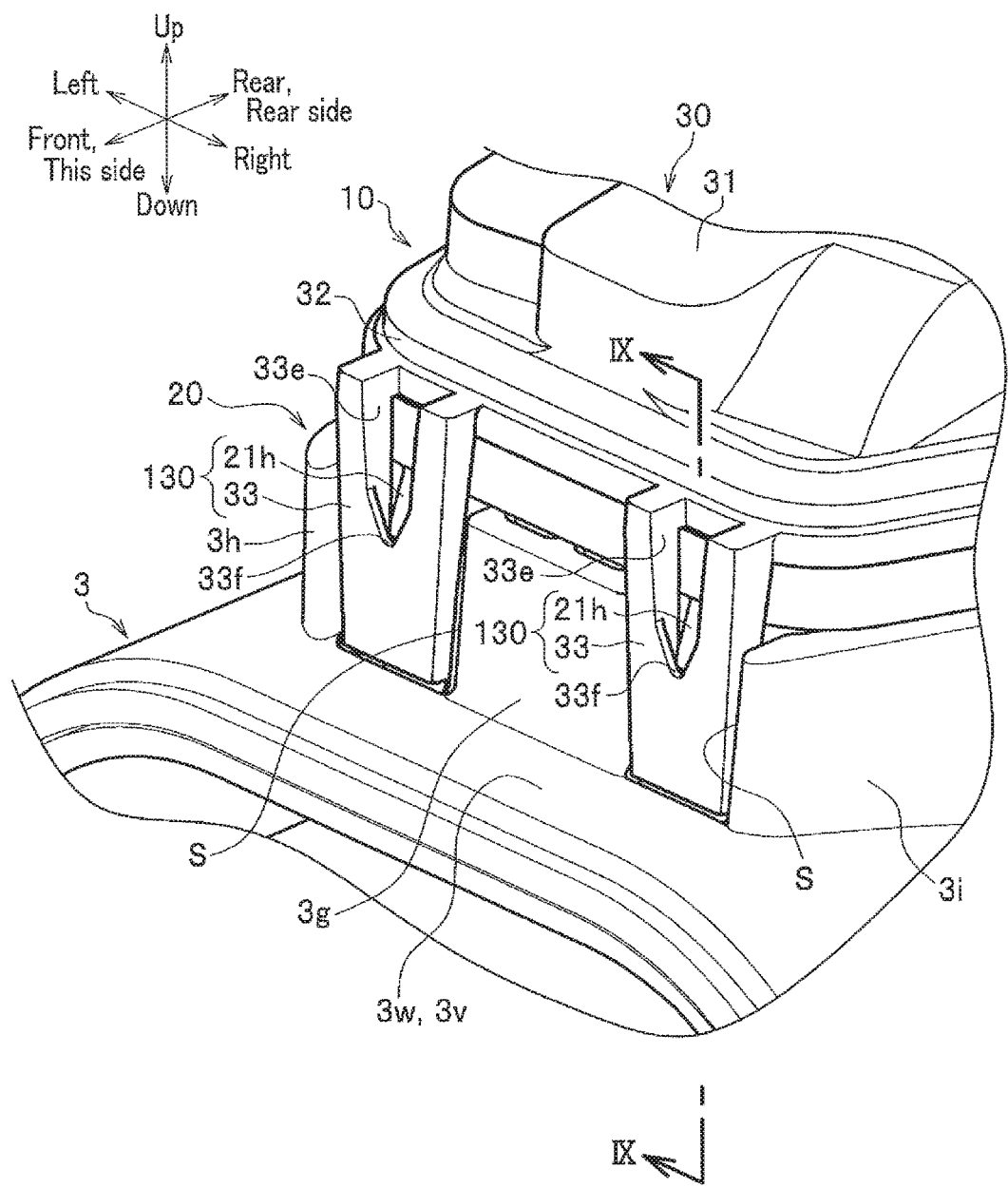
FIG. 8 is a partial enlarged perspective view showing a connector of the actuator according to the embodiment.

As shown in FIG. 8, each of the front claws 33 is a plate-like part having a rectangular shape in a front view, which extends downward from the outer peripheral edge 32 of the ceiling 31. The front claws 33 are respectively disposed in the gaps S, that is, the front claws 33 are positioned between the front wall 3g and the respective side walls 3h, 3i. As shown in FIG. 9, each front claw 33 includes a tip 33a positioned on the power receiving connector 3 side, a front surface 33b positioned on this side of the charging port 2a, and a rear surface 33c positioned on the rear side of the charging port 2a.

Each tip 33a (lower end in the present embodiment) of the front laws 33 is positioned above the second installing surface 3x and behind the step surface 3y. Each tip 33a is positioned at a position where it is hidden behind the step surface 3y not to be exposed when the inside of the vehicle is viewed from the charging port 2a. Each tip 33a is close to the step surface 3y in the present embodiment, but may be in contact with the step surface 3y. Furthermore, each tip 33a is positioned-above the second installing surface 3x in the present embodiment, but may be positioned close to or in contact with the second installing surface 3x. A first corner defined by each tip 33a and the corresponding front surface 33b is notched to form a tip notch portion 33d. Each tip notch portion 33d has a shape corresponding to a second corner defined by the first installing surface 3w and the step surface 3y. Each tip notch portion 33d is positioned with a gap between the first installing surface 3w and the tip notch portion 33d, with a gap between the step surface 3y and the same 33d, and with a gap between the second corner and the same 33d.

A through hole 33e passing from the front surface 33b through the rear surface 33c of an upper half of each front claw 33 is formed. A bottom surface 33f of the through hole 33e has a tapered shape in the present embodiment, and the tapered shape has a narrower gap as it goes downward as shown in FIG. 8. A third corner defined by the bottom surface 33f and the rear surface 33c is notched to form an engagement notch portion 33g. The engagement notch portion 33g includes a notch bottom surface 33h and a notch step surface 33i. The notch bottom surface 33h is formed lower than the bottom surface 33f. The notch bottom surface 33h is inclined so as to be lower as it goes toward the rear side from this side of the charging port 2a. The notch step surface 33i is a vertical surface for connecting the bottom surface 33f and the notch bottom surface 33h. The notch step surface 33i serves as a hiding part for hiding a part (an engaging part between each engaging protrusion 21h and the corresponding front claw 33) of each engaging protrusion 21h when the inside of the vehicle is viewed from the charging port 2a. Note that, the notch step surface 33i may be an inclined surface which is inclined downward toward this side or the rear side of the charging port 2a as it goes toward the notch bottom surface 33h from the bottom surface 33f.

Each engaging protrusion 21h is a protrusion which extends toward the corresponding front claw 33 from the front surface of the lower housing 20, and engages with the front claw 33. Each engaging protrusion 21h includes an extended end surface 21k and an engagement surface 21m. The extended end surface 21k has an inclined surface inclined toward this side of the charging port 2a as it goes downward, and a vertical surface (plane surface) which is connected to the inclined surface and extends downward. The vertical surface of the extended end surface 21k is close to the notch step surface 33i in the present embodiment, but may be in contact with the notch step surface 33i. The engagement surface 21m is a surface which comes into contact with to engage with the notch bottom surface 33h, and is an inclined surface having an inclined angle equal to or nearly equal to the inclined angle of the notch bottom surface 33h. In the present embodiment, a part of each engaging protrusion 21h including the corresponding engagement surface 21m has such a position that the part is hidden behind the notch step surface 33i not to be exposed when the inside of the vehicle is viewed from the charging port 2a. The connector 130 is constructed so that an engagement between each front claw 33 and the corresponding engaging protrusion 21h is disengaged when the tip 33a of the front claw 33 is moved toward this side in a state that the actuator 10 is not installed over the installing surface 3v.

According to the present embodiment described as above, as shown in FIG. 9, the installing surface 3v includes the step surface 3y as a hiding part which hides the tips 33a of the front claws 33.

Therefore, the corresponding tip 33a of each front claw 33 is hidden behind the step surface 3y when the inside of the vehicle is viewed from the charging port 2a, and the corresponding tip 33a of each front claw 33 cannot be moved toward this side because of the step surface 3y. That is, mischief of a third party to the front claws 33 can be prevented.

In particular, because the installing surface 3v of the power receiving connector 3 has a difference in height to form the step surface 3y for hiding the tips 33a of the front claws 33 according to the present embodiment, mischief of a third party to the front claws 33 can be prevented without requiring any additional parts. Furthermore, assembly workability of the rear claws 34 and the engagement protrusions 21g is maintained as before. Thus, cost necessary for preventing the mischief of a third party can be restrained.

Furthermore, according to the present embodiment, as shown in FIG. 9, each front claw 33 has its notch step surface 33i which is a hiding section for hiding a part (an engagement part between each front claw 33 and the corresponding engaging protrusion 21h) of the corresponding engaging protrusion 21h.

Therefore, mischief of a third party to the engaging protrusions 21h can be prevented. Furthermore, because a structure behind each notch step surface 33i cannot be seen when the inside of the vehicle is viewed from the charging port 2a, a deterrent to the mischief can be enhanced.

Hereinabove, the embodiment of the present invention has been described, but the present invention is not limited thereto and can be modified as appropriate without departing from the spirit of the present invention.

For example, the power receiving connector 3 in FIG. 1 may have its axis inclined with respect to the horizontal plane so as to extend downward as it goes toward the inside of the vehicle, depending on the position where the charging port 2a is arranged. In this case, the actuator 10 is attached to the power receiving connector 3 of the vehicle 1 in a state of declining toward its rear end with respect to the horizontal plane like the power receiving connector 3.

In the present embodiment, the actuator 10 shown in FIG. 8 is installed on the upper part of the power receiving connector 3, but may be installed on other parts like a lower part or side parts of the power receiving connector 3.

The present invention can be applied to not only a set of the front claws 33 and the engaging protrusions 21h but also another set of the rear claws 34 and the engaging protrusions 21g which cannot be seen from the charging port 2a.

The tip notch portion 33d is formed at the first corner defined by the tip 33a and the front surface 33b in the present embodiment, but the tip 33a may be flat without forming the tip notch portion 33d.

In the present embodiment, a part (an engaging part between each engaging protrusion 21h and the corresponding front claw 33) of each engaging protrusion 21h can be hidden because of the notch step surface 33i when the inside of the vehicle is viewed from the charging port 2a, but the whole of each engaging protrusion 21h may be hidden. In this case, the whole of each engaging protrusion 21h may be hidden without forming the through hole 33e in each front claw 33, or the whole of each engaging protrusion 21h may be hidden by lengthening the notch step surface 33i upward by a predetermined length. In the case where the through hole 33e is not formed, the engagement notch portion 33g is formed by notching the rear surface 33c toward this side by a predetermined depth.

Furthermore, each engaging protrusion 21h may be configured to engage with the bottom surface 33f of the corresponding through hole 33e without forming the engagement notch portion 33g, so that the engaging protrusions 21h are not hidden.

In the present embodiment, the step surface 3y, which is formed by forming a difference in height of the installing surface 3v of the power receiving connector 3, serves as a hiding part, but the present invention is not limited thereto.

Figure 10A:
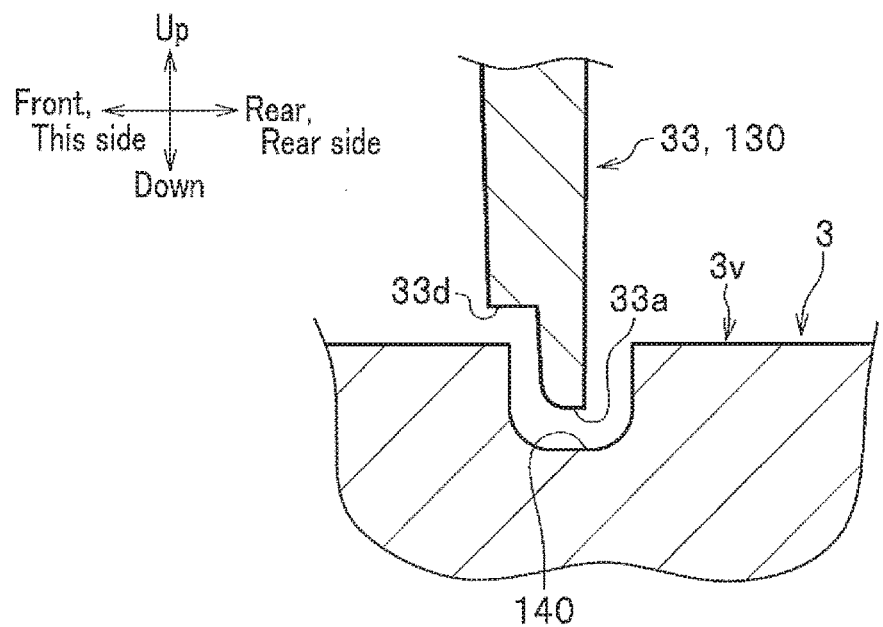
FIG. 10A is a partial enlarged sectional view showing a hiding part according to a modified embodiment.

For example, a recessed portion 140 shown in FIG. 10A can serve as a hiding part. The recessed portion 140 according to the modified embodiment is formed on the installing surface 3v to be a concave area lower than the other area of the installing surface 3v. A shape of the recessed portion 140 of the modified embodiment has a rectangle in a sectional view, but is not limited thereto. The recessed portion 140 opens upward. Furthermore, the recessed portion 140 extends in a direction intersecting the front-rear direction of the charging port 2a (see FIG. 9), and the direction is orthogonal to the front-rear direction in the modified embodiment. The tips 33a of the front claws 33 are inserted in the recessed portion 140. That is, the tips 33a are positioned at positions where they cannot be seen when the inside of the vehicle is viewed from the charging port 2a because they are hidden in the recessed portion 140. Therefore, the modified embodiment has also an advantageous effect similar to the previous embodiment.

Figure 10B:
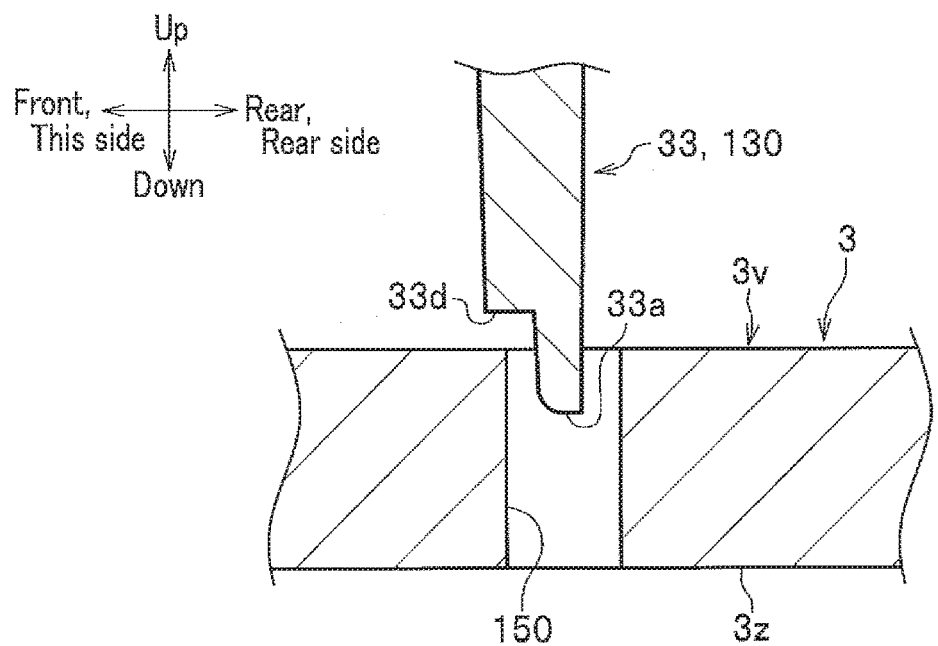
FIG. 10B is a partial enlarged sectional view showing a hiding part according to another modified embodiment.

Furthermore, a through hole 150 shown in FIG. 10B can also serve as a hiding part. The through hole 150 according to this another modified embodiment is a through hole passing through from the installing surface 3v to an inner surface 3z of the power receiving connector 3. The tips 33a of the front claws 33 are inserted in the through hole 150. That is, the tips 33a are positioned at positions where they cannot be seen when the inside of the vehicle is viewed from the charging port 2a because they are hidden in the through hole 150. Therefore, this modified embodiment has also an advantageous effect similar to the previous embodiments.

DESCRIPTION OF REFERENCE SYMBOLS

1 Vehicle
2 Vehicle body
2a Charging port
3 Power receiving connector
3v Installing surface
3y Step surface (Hiding part)
4 Charging connector
10 Actuator
11 Housing
20 Lower housing (First housing)
21h Engaging protrusion
30 Upper housing (Second housing)

33 Front claw (Claw)
33a Tip
33g Engagement notch portion
33h Notch bottom surface
33i Notch step surface (Another hiding part)
130 Connector
140 Recessed portion (Hiding part)
150 Through hole (Hiding part)

What is claimed is:

1. An assembly, comprising;
a power receiving connector having an installing surface; and
an actuator,
wherein the actuator comprises:
  a first housing installed on the installing surface;
  a second housing attached to the first housing; and
  a connector that connects the first housing and the second housing,
wherein the first housing and the second housing are supported on top of the installing surface, and
wherein the installing surface includes a hiding part that hides a tip of the connector.

2. The assembly according to claim 1,
wherein the connector comprises:
a claw provided on the second housing; and
an engaging protrusion provided on the first housing and engaging with the claw, and
wherein the hiding part hides a tip of the claw.

3. The assembly according to claim 2, wherein the hiding part includes a step surface, a recessed portion or a through hole.

4. The assembly according to claim 2, wherein the claw includes another hiding part that hides a whole or a part of the engaging protrusion.

5. The assembly according to claim 3, wherein the claw includes another hiding part that hides a whole or a part of the engaging protrusion.

* * * * *